United States Patent Office 3,770,729
Patented Nov. 6, 1973

3,770,729
N-SUBSTITUTED PIPERIDINE COMPOUNDS
Michio Nakanishi, Oita, and Takanori Oe and Chiaki Tashiro, Yoshitomi-machi, Japan, assignors to Yoshitomi Pharmaceutical Industries, Ltd., Osaka, Japan
No Drawing. Filed Dec. 21, 1971, Ser. No. 210,592
Claims priority, application Japan, Dec. 22, 1970, 45/117,048; Dec. 25, 1970, 45/128,281; Dec. 28, 1970, 46/127,144
Int. Cl. C07d 29/28
U.S. Cl. 260—240 TC    4 Claims

ABSTRACT OF THE DISCLOSURE

N-substituted piperidine compounds of the formula

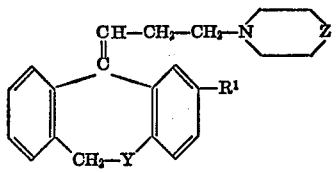

wherein Y is O, S or $SO_2$, $R^1$ is H, Cl, $CH_3$ or $OCH_3$ and Z is a bivalent group selected from the group consisting of (1) 

in which $R^2$ is OH, CN, $CONH_2$, $COOC_2H_5$ or $COCH_3$ and $R^3$ is dimethylamino, piperidino, morpholino, phenyl substituted phenyl (the substituent being Cl, $CH_3$ or $CF_3$) or acetylamino, (2) 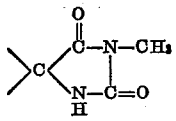

and (3) 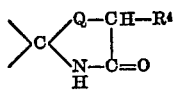

in which Q is O or S and $R^4$ is H, $CH_3$ or phenyl, and pharmaceutically acceptable acid addition salts thereof are useful as psychotropic agents for the treatment of schizophrenia, psychoneurosis, manic-depressive psychosis and the like.

PRIOR ART

In our copending application, filed Jan. 7, 1971, Ser. No. 104,770, there are disclosed compounds of formula

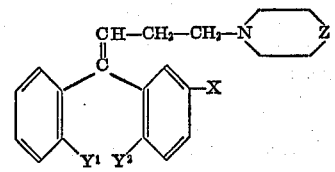

and pharmaceutically acceptable acid addition salts thereof, wherein X is H, Cl, $CH_3$, $CF_3$, $OCH_3$ or $SCH_3$, each of $Y^1$ and $Y^2$ is H or $Y^1$ and $Y^2$ combinedly represent $-CH_2-CH_2-$, $-CH=CH-$, $-C(CH_3)_2-$, $-O-$ or $-S-$, or the carbon atoms of the benzene rings connecting with $Y^1$ and $Y^2$ may be directly combined to form a fluorine ring, and Z is

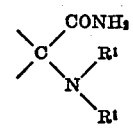

(in which $-N(R^1)_2$ is dimethylamino or piperidino) or

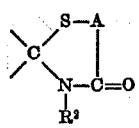

(in which A is $-CH_2-$, $-CH_2-CH_2-$ or

$-CH(CH_3)-$ and $R^2$ is H or alkyl of 1 to 2 carbon atoms), which are useful as psychotropic agents.

This invention relates to novel and therapeutically valuable N-substituted piperidine compounds of the formula

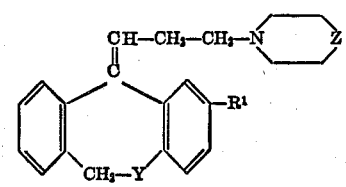

(I)

and pharmaceutically acceptable acid addition salts thereof, wherein Y is O, S or $SO_2$, $R^1$ is H, Cl, $CH_3$ or $OCH_3$ and Z is a bivalent group selected from the group consisting of (1) 

in which $R^2$ is OH, CN, $CONH_2$, $COC_2H_5$ or $COCH_3$ and $R^3$ is dimethylamino, piperidino, morpholino, phenyl, substituted phenyl (the substituent being Cl, CH₃ or CF₃) or acetylamino, (2) 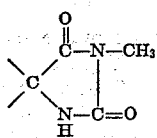

and (3) 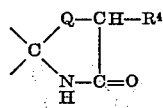

in which Q is O or S and R⁴ is H, CH₃ or phenyl.

The compounds of Formula I are produced by the following methods:

(a) By the reaction of a compound of the formula

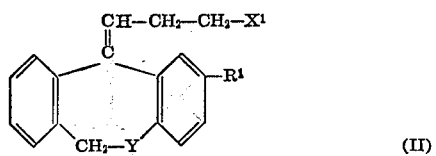

wherein $X^1$ is a reactive atom or radical such as halogen, methylsulfonyloxy, phenylsulfonyloxy or tolylsulfonyloxy, with a compound of the formula

This reaction is usually carried out in a solvent, if necessary in the presence of a deacidfying agent and a condensation accelerator, usually at a temperature of 20° to 150° C. for a period of 5 to 10 hours. The solvent may be water, methanol, ethanol, acetone, dioxane, tetrahydrofuran, benzene, toluene, xylene, pyridine, dimethylformamide, dimethylsulfoxide or a mixed solvent thereof. The deacidfying agent may be sodium hydroxide, potassium hydroxide, sodium methoxide, potassium ethoxide, sodium carbonate, potassium carbonate, pyridine or triethylamine. The condensation accelerator may be an alkali metal iodide ( e.g. NaI, KI).

(b) In order to produce the compounds of Formula I wherein Z is

$R^{3'}$ being dimethylamino, piperidino or morpholino), by the reaction of a compound of the formula

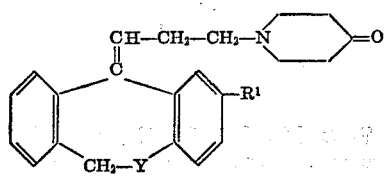

with a cyanide of the formula

<p style="text-align:right">Me—CN    (V)</p> wherein Me is hydrogen or alkali metal, with an amine of the formula

<p style="text-align:right">HN—R³'    (VI)</p>

This reaction is usually carried out in an inert solvent such as water, an alcohol (e.g. methanol, ethanol, propanol), tetrahydrofuran, dioxane or a mixed solvent thereof at a temperature from room temperature to about the boiling point of the solvent employed for a period of 3 to 25 hours. Mostly, however, the reaction is preferably carried out in a solvent such as water, an alcohol or a mixed solvent thereof.

(c) In order to produce the compounds of Formula I wherein Z is

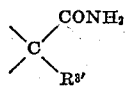

($R^{3'}$ being as defined above), by hydrolyzing a compound which is prepared by the method (b) mentioned above.

The hydrolysis is, for example, carried out by using a stoichiometrically 5 to 20 times molar quantity of 70% to 95% sulfuric acid under heating at 60° to 95° C. for 30 minutes to 3 hours.

(d) In order to produce the compounds of Formula I wherein Z is

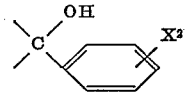

($X^2$ being H, Cl, CH₃ or CF₃), by the reaction of a compound of Formula IV above with a Grignard reagent of the formula

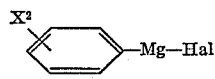

wherein Hal is halogen.

The reaction is carried out by the conventional manner adopted in the Grignard reaction, that is, by mixing a compound of Formula IV and a compound of Formula VII prepared from a phenyl or substituted phenyl halide and metallic magnesium in an inert solvent such as diethyl ether, tetrahydrofuran, dioxane, diethylene glycol dimethyl ether or isopropyl ether, and then by heating the resulting mixture at 20° C. to the boiling point of the solvent employed for 2 to 30 hours, and finally decomposing the reaction product with dilute acid or aqueous ammonium chloride solution. It is possible to use, if necessary, another solvent such as benzene, xylene, hexane or cyclohexane as the inert solvent.

The starting compounds (II) and (IV) can be produced, for example, by the following methods:

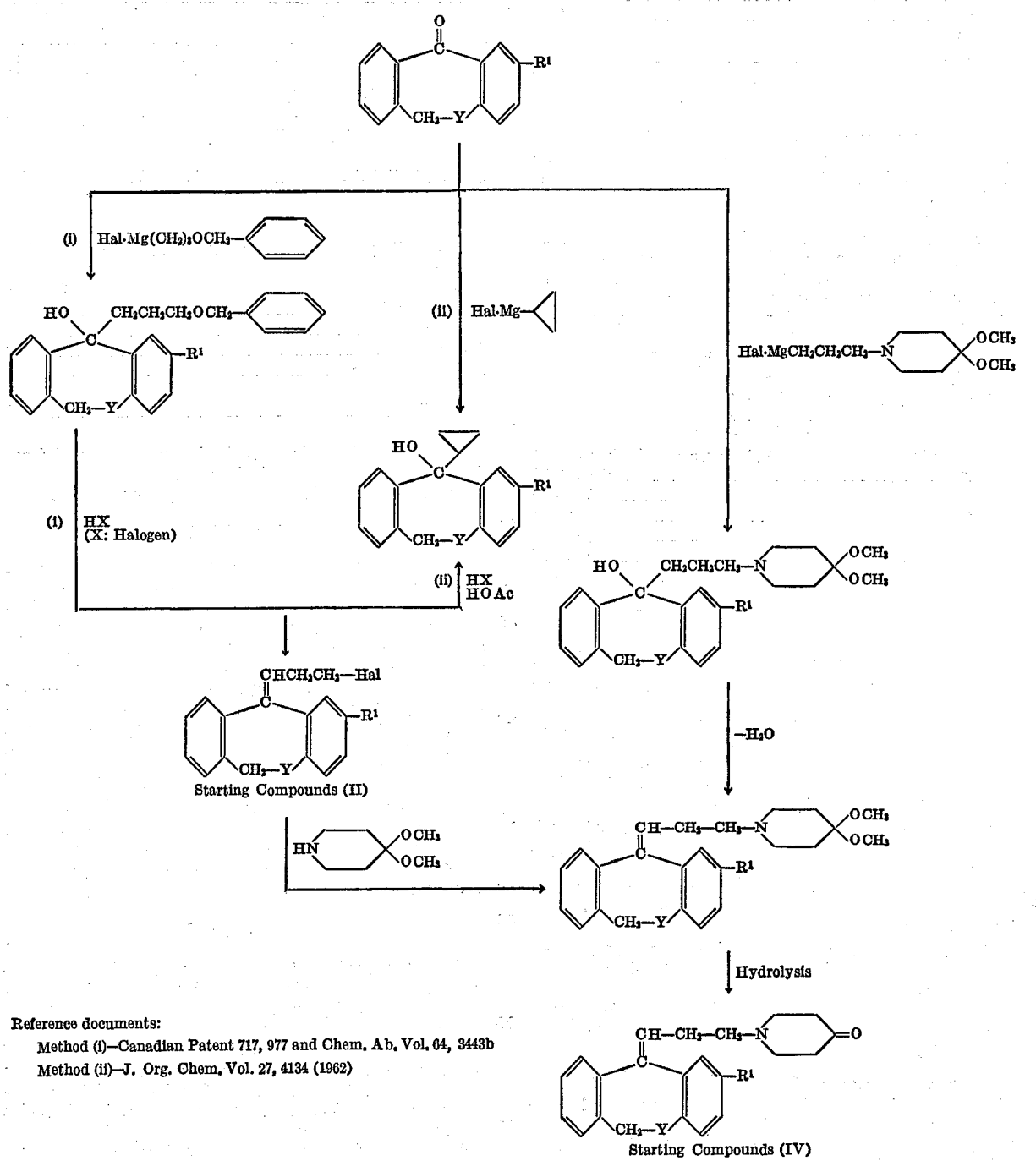

Reference documents:
Method (i)—Canadian Patent 717, 977 and Chem. Ab. Vol. 64, 3443b
Method (ii)—J. Org. Chem. Vol. 27, 4134 (1962)

The compounds of Formula I can be converted into acid addition salts with various inorganic acids (e.g. hydrochloric, hydrobromic, sulfuric, nitric acid) or various organic acids (e.g. oxalic, maleic, fumaric, citric, tartaric, methansulfonic acid).

The compounds of Formula I and pharmaceutically acceptable acid addition salts thereof have excellent pharmacological actions such as suppression of spontaneous motility and reserpine potentiations as shown by the following tests.

The tests were carried out by the following procedures:

SUPPRESSION OF SPONTANEOUS MOTILITY

Suppression of spontaneous motility was measured by the Photocell method described by P. B. Dews in "British Journal of Pharmacology," vol. 8, p. 46 ff. (1953). The procedure was as follows:

Each group consisting of five male mice (dd-strain mice weighing 20 to 25 g.) was kept in a compartment. Forty minutes after the intraperitoneal administration of the test compounds, the spontaneous motility was counted for 20 minutes. The $ED_{50}$ shows the dose required for 50% suppression of spontaneous motility.

The results are shown in Table 1.

TABLE 1

| Compound: | ED$_{50}$ (mg./kg. body weight) |
|---|---|
| A | 1.25–2.5 |
| B | 0.63–1.25 |
| D | 0.31–0.63 |
| E | 2.5–5.0 |
| G | 2.5–5.0 |

RESERPINE POTENTIATION

Reserpine potentiation was measured by the method described by M. D. Aceto in "Toxicology and Applied Pharmacology," vol. 7, p. 329 ff. (1965). The procedure was as follows:

Thirty minutes after oral administration of the test compounds to female mice (dd-strain mice weighing 20 to 25 g., each group consisting of four mice), reserpine (10 mg./kg. of body weight) was injected intraperitoneally. The degree of blepharoptosis of both eyes was observed 15, 60, 120 and 180 minutes after the administration of reserpine. The PD$_{30}$ shows an effective dose potentiating the effect of reserpine by 30% 15 minutes after the administration of reserpine.

The results are shown in Table 2.

TABLE 2

| Compound: | PD$_{30}$ (mg./kg. body weight) |
|---|---|
| A | 0.63–1.25 |
| B | 0.31–0.63 |
| C | 1.25–2.5 |
| E | 0.63–1.25 |
| F | 0.31–1.25 |
| G | 0.31–0.63 |

In the above table, the test compounds (A, B, C, . . . G) are as follows:

A: 11 - [3 - (4 - carbamoyl - 4 - piperidinopiperidino)-propylidene] - 6,11 - dihydrodibenz[b,e]oxepin dihydrochloride ½ hydrate
B: 11 - [3 - (4 - hydroxy - 4 - phenylpiperidino)propylidene]-6,11-dihydrodibenz[b,e]oxepin hydrochloride
C: 2 -chloro - 11 - [3 - (4 - carbamoyl - 4 - piperidinopiperidino)propylidene] - 6,11 - dihydrodibenz[b,e]oxepin dihydrochloride ½ hydrate
D: 11 - [3 - (4 - hydroxy - 4 - p - chlorophenylpiperidino)propylidene] - 6,11 - dihydrodibenz[b,e]oxepin hydrochloride ½ hydrate
E: 11-[3-(4-carbamoyl-4-morpholinopiperidino)propylidene]-6,11-dihydrodibenz[b,e]oxepin dihydrochloride ½ hydrate
F: 11-[3-(2,4-dioxo-3-methyl-1,3,8-triazaspiro[4.5]dec-8-yl)propylidene]-6,11-dihydrodibenz[b,e]hydrochloride
G: 11-[3-(1-thia-3-oxo-4,8-diazaspiro[4.5]dec-8-yl)propylidene]-6,11-dihydrodibenz[b,e]oxepin hydrochloride.

In view of the tests including those mentioned above, the compounds (I) of the present invention and pharmaceutically acceptable acid addition salts thereof can be administered safely as psychotropic agents for the treatment of schizophrenia, psychoneurosis, manic-depressive psychosis and the like, in the form of a pharmaceutical preparation with a suitable and conventional carrier or adjuvant, administrated orally, without harm to the patient.

The oral daily dose of compound (I) or a salt thereof for human adults usually ranges from 30 to 200 milligrams.

The pharmaceutical preparations can take any conventional form such as tablets, capsules, powders, granules, etc.

The following are the examples of the formulae to be taken when the compound (I) of the present invention and acid addition salts are administered for the pharmaceutical purpose.

(i) 5 mg. and 25 mg. tablets are prepared from the following compositions:

|  | 5 mg. tablet | 25 mg tablet |
|---|---|---|
| Compound E, mg | 5 | 25 |
| Lactose, mg | 62 | 64 |
| Microcrystalline cellulose, mg | 10 | 15 |
| Methyl cellulose, mg | 1 | 1 |
| Starch, mg | 7 | 10 |
| Talc, mg | 4 | 4 |
| Magnesium stearate, mg | 1 | 1 |
| Total | 90 | 120 |

(ii) 10% powders are prepared from the following compositions:

|  | Percent |
|---|---|
| Compound E | 10 |
| Lactose | 69 |
| Starch | 20 |
| Methyl cellulose | 1 |
| Total | 100 |

The present invention will be better understood from the following examples, which are merely intended to be illustrative and not limitative of the present invention.

EXAMPLE 1

A mixture of 7.5 g. of 11-(3-bromopropylidene)-6,11-dihydrodibenz[b,e]oxepin, 6 g. of 4-carbamoyl-4-piperidine, 4.9 g. of potassium carbonate, 30 ml. of toluene and 30 ml. of dimethylformamide is heated at 110–112° C. with stirring for 6 hours. The cold water is added to the reaction mixture, the whole is extracted with toluene and washed with water. The toluene layer is extracted with dilute hydrochloric acid and the extract is made alkaline with potassium carbonate with cooling. The brown oil liberated is extracted with chloroform, the extract is dried and the chloroform is distilled off. The jelly-like residue is dissolved in ethanol, and hydrogen chloride gas is introduced into the solution. The crystals precipitated are collected and refined from aqueous ethanol to give 11-[3-(4-carbamoyl - 4 - piperidinopiperidino)propylidene]-6,11-dihydrodibenz[b,e]oxepin dihydrochloride ½ hydrate melting at 283° C. (decomposition).

EXAMPLE 2

A mixture of 7 g. of 11-(3-bromopropylidene)-6,11-dihydrodibenz[b,e]oxepin, 5.1 g. of 4-hydroxy-4-phenylpiperidine, 4.6 g. of potassium carbonate, 30 ml. of toluene and 30 ml. of dimethylformamide is heated at 110–120° C. with stirring for 6 hours. After cooling, water is added to the reaction mixture, and the whole is extracted with toluene and washed with water. Then 20 ml. of 5% hydrochloric acid is added to the toluene layer. The jelly-like oil liberated is separated by decantation, and dissolved in chloroform. After drying, the chloroform is distilled off. The residue is dissolved in 30 ml. of acetone, and the solution is allowed to stand in a cold room to cause crystallization. The crystals obtained are refined from 2-propanol to give 11-[3-(4-hydroxy-4-phenylpiperidino)propylidene]-6,11-dihydrodibenz[b,e]oxepin monohydrochloride melting at 212–213° C.

EXAMPLES 3–26

Other examples of compounds (I) and acid addition salts thereof which can be produced from a compound (II) and a compound (III) in a manner similar to that described in Example 1 or 2 are shown in the following tables.

Examples of compounds (I) wherein Z is

are as follows:

is as follows:

| Example | Y | R¹ | Salt and melting point (° C.) |
|---|---|---|---|
| 22 | O | H | HCl, 298 (decomposition). |

| Example | Y | R¹ | R² | R³ | Salt and melting point (° C.) |
|---|---|---|---|---|---|
| 3 | O | H | —CONH₂ | —N(CH₃)₂ | 2HCl, 256–257 [1] |
| 4 | O | —CH₃ | —CONH₂ | —N(CH₃)₂ | 2HCl–½H₂O, 256 [1] |
| 5 | O | —Cl | —CONH₂ | —N(piperidine) | 2HCl–¼H₂O, 280–281 [1] |
| 6 | O | —OCH₃ | —CONH₂ | —N(piperidine) | 2HCl, 269 [1] |
| 7 | O | H | —CONH₂ | —N(morpholine) | 2HCl–½H₂O, 255–256 [1] |
| 8 | O | —Cl | —CONH₂ | —N(morpholine) | 2HCl–½H₂O, 264 [1] |
| 9 | S | H | —CONH₂ | —N(piperidine) | 2HCl, 274–275 [1] |
| 10 | S | H | —CONH₂ | —N(morpholine) | 2HCl–½H₂O, 261 [1] |
| 11 | SO₂ | H | —CONH₂ | —N(piperidine) | 2HCl–½H₂O, 279–280 [1] |
| 12 | O | H | —OH | —C₆H₄—Cl | HCl–½H₂O, 174–176 |
| 13 | O | H | —OH | —C₆H₄—CF₃ | HCl, 198–200 |
| 14 | O | —CH₃ | —OH | —C₆H₅ | HCl, 159 |
| 15 | O | —OCH₃ | —OH | —C₆H₅ | HCl, 156 [1] |
| 16 | S | H | —OH | —C₆H₅ | HCl, 120 |
| 17 | S | H | —OH | —C₆H₄—CH₃ | HCl, 159–160 |
| 18 | SO₂ | H | —OH | —C₆H₅ | HCl, 105 |
| 19 | O | H | —CN | —C₆H₅ | HCl, 245–247 |
| 20 | O | H | —COCH₃ | —C₆H₅ | HCl–½2-propanol, 220–222. |
| 21 | O | H | —COOC₂H₅ | —NHCOCH₃ | HCl, 231–232 [1]. |

[1] Decomposition.

Example of compound (I) wherein Z is

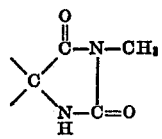

Examples of compounds (I) wherein Z is

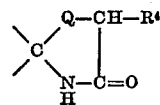

are as follows:

| Example | Y | R¹ | Q | R⁴ | Salt and melting point (°C.) |
|---|---|---|---|---|---|
| 23 | O | H | S | H | HCl, 290.[1] |
| 24 | O | H | O | —CH₃ | HCl, 212–215.[1] |
| 25 | O | H | S |  | Maleate, 180–181.[1] |
| 26 | S | H | O | —CH₃ | HCl, 183.[1] |

[1] Decomposition.

EXAMPLE 27

A mixture of 6.6 g. of 11-[3-(4-oxopiperidino)propylidene]-6,11-dihydrodibenz[b,e]oxepin, 2.6 g. of potassium cyanide and 4.8 g. of piperidine hydrochloride in 10 ml. of water plus 40 ml. of ethanol is heated at 70° C. with stirring for 24 hours. After cooling, the solvent is distilled off under vacuum, and the residue is dissolved in 100 ml. of toluene and washed with water. The toluene layer is dried over anhydrous magnesium sulfate, and then the toluene is distilled off. The jelly-like residue (crude 11 - [3-(4-cyano - 4 - piperidinopiperidino)propylidene]-6,11-dihydrodibenz[b,e]oxepin, 7.2 g.) thus obtained is dissolved in 50 ml. of 85% sulfuric acid under heating. The solution is heated at 75 to 95° C. for an hour. After cooling, the solution is added onto 200 g. of ice and neutralized by an aqueous solution of sodium hydroxide. The oil liberated is extracted with toluene, the toluene layer is washed with water, and dried, and the toluene is distilled off. The residue is dissolved in ethanol, and hydrogen chloride gas is introduced into the solution. The crystals precipitated are collected and refined from aqueous ethanol to give 3.7 g. of 11-[3-(4-carbamoyl - 4 - piperidinopiperidino)propylidene]-6,11-dihydrodibenz[b,e]oxepin dihydrochloride ½ hydrate melting at 283° C. (decomposition).

Proceeding by the method of Example 27, but substituting equivalent amounts of appropriate starting materials (IV), (V) and (VI), the compounds (I) identical to the products of above Examples 1, 3–11 are also produced.

EXAMPLE 28

A soluion of 16 g. of 11-[3-(4-oxopiperidino)propylidene]-6,11-dihydrodibenz[b,e]oxepin in 50 ml. of tetrahydrofuran is added at 10° to 20° C. to a solution of phenyl magnesium bromide in tetrahydrofuran prepared from 10.5 g. of phenyl bromide and 1.6 g. of metallic magnesium in 50 ml. of tetrahydrofuran. The resulting mixture is stirred at room temperature and then heated under reflux for 2.5 hours. After cooling, 100 ml. of a saturated ammonium chloride solution is added to the reaction mixture. The upper oil layer is extracted with toluene. The extract is washed with water, dried and concentrated. The remaining oil is dissolved in benzene, and 30 ml. od about 5% hydrochloric acid is added to the solution. The mixture is stirred to liberate a jelly-like hydrochloride. The benzene and water phases are removed by the decantation and the jelly-like residue is dissolved in chloroform. After drying, the chloroform is distilled off, a small amount of acetone is added to the residue, and the whole is allowed to stand in a cold room. The crystals thus formed are collected and refined from aqueous acetone to give 12 g. of 11-[3-(4-hydroxy-4-phenylpiperidino)propylidene] - 6,11 - dihydrodibenz[b,e]oxepin hydrochloride melting at 212–213° C.

Proceeding by the method of Example 28, but substituting equivalent amounts of appropriate starting materials (IV) and (VII), the compounds (I) identical to the products of above Examples 2, 12–18 are also produced.

What is claimed is:

1. A compound selected from the group consisting of a N-substituted piperidine compound of the formula:

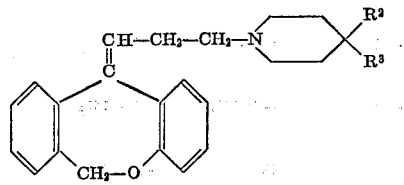

wherein R² represents a member selected from the group consisting of a OH group and a —CONH₂ group and R³ represents a member selected from the group consisting of a phenyl group, a piperidino group and a morpholino group.

2. A compound according to claim 1, said compound being 11-[3-(4-carbamoyl-4-piperidinopiperidino)propylidene]-6,11-dihydrodibenz[b,e]oxepin.

3. A compound according to claim 1, said compound being 11-[3-(4-hydroxy-4-phenylpiperidino)propylidene]-6,11-dihydrodibenz[b,e]oxepin.

4. A compound according to claim 1, said compound being 11 - [3-(4-carbamoyl-4-morpholinopiperidino)propylidene]-6,11-dihydrodibenz[b,e]oxepin.

References Cited
UNITED STATES PATENTS

| 3,527,766 | 9/1970 | Protiva et al. | 260—240 TC X |
| 3,668,310 | 6/1972 | Nakanishi et al. | 260—293.59 |

OTHER REFERENCES

Starch et al.: Monatshefte fur Chemie, vol. 93, pp. 896–904 (1962).

JOHN D. RANDOLPH, Primary Examiner

U.S. Cl. X.R.

424—248, 267; 260— 243 R, 293.66, 293.86, 327 B, 333